(12) United States Patent
Yu et al.

(10) Patent No.: US 8,035,559 B2
(45) Date of Patent: Oct. 11, 2011

(54) GLOBAL POSITIONING SYSTEM RECEIVER

(75) Inventors: Xiaoguang Yu, Wuhan (CN); Haiquan Huang, Chengdu (CN); Jinghua Zou, Chengdu (CN)

(73) Assignee: O2 Micro, Inc, Santa Clara, CA (US)

( * ) Notice: Subject to any disclaimer, the term of this patent is extended or adjusted under 35 U.S.C. 154(b) by 309 days.

(21) Appl. No.: 12/156,226

(22) Filed: May 30, 2008

(65) Prior Publication Data

US 2009/0295634 A1 Dec. 3, 2009

(51) Int. Cl.
*G01S 19/27* (2010.01)
(52) U.S. Cl. .................................. 342/357.66
(58) Field of Classification Search .......... 342/357.66, 342/357.02, 357.15, 358
See application file for complete search history.

(56) References Cited

U.S. PATENT DOCUMENTS

| | | | |
|---|---|---|---|
| 6,058,338 A | 5/2000 | Agashe et al. | |
| 6,134,483 A * | 10/2000 | Vayanos et al. | 342/355 |
| 2002/0068997 A1* | 6/2002 | Agashe et al. | 701/214 |
| 2004/0263386 A1 | 12/2004 | King et al. | |
| 2006/0181452 A1* | 8/2006 | King et al. | 342/357.15 |
| 2009/0315772 A1* | 12/2009 | Wengler et al. | 342/357.15 |

OTHER PUBLICATIONS

Qualcomm Europe, "Positioning Enhancements for wireless Assisted GPS Technology in Realse'00", 3GPP Draft; R2-001363, 3rd Generation Partnership Project (3GPP), Mobile Competentce Center; 650, Route Des Lucioles; F-06921 Sophia-Antipolis Cedex; France, vol. Ran WG2, No. Paris, France; 20000630, Jun. 30, 2000, XP050115766 [retrieved on Jun. 30, 2000] (12 pages).
Extended Europe Search Report dated Jun. 28, 2010 for corresponding EP application 08165584.7.

* cited by examiner

*Primary Examiner* — Thomas H Tarcza
*Assistant Examiner* — Fred H Mull

(57) ABSTRACT

A GPS receiver includes a demodulator for obtaining ephemeris data and almanac data from a navigation message sent by satellites, and includes a calculator. The calculator is used for calculating almanac correction parameters according to coordinate differences between ephemeris-based coordinates of the satellites and almanac-based coordinates of the satellites. The GPS receiver also includes a satellite position calculator for calculating the ephemeris-based coordinates of the satellites according to the ephemeris data, for calculating the almanac-based coordinates of the satellites according to the almanac data, and for calculating positions of the satellites according to the ephemeris data, the almanac data and the almanac correction parameters.

23 Claims, 4 Drawing Sheets

GLOBAL POSITIONING SYSTEM RECEIVER

TECHNICAL FIELD

The present invention relates to a global positioning system (GPS) and more particular to a GPS receiver.

BACKGROUND

Currently the demands of automobiles, electronic devices, etc. are increasing since the related technologies have been rapidly developed. A global positioning system (GPS) has been widely used in the above-mentioned systems to meet the demands in different fields (e.g., navigation systems and portable devices).

A GPS receiver is used to receive signals from various satellites and to process the received signals in order to perform GPS positioning. Typically, GPS positioning can be performed in a certain time period after the GPS receiver is powered on. The GPS receiver has a parameter named time to first fix (TTFF) that can be defined as a time period for the GPS receiver to find satellites after the user first turns it on and to provide the first geographical location fix when the GPS receiver has been staying in a standby mode for hours or days. The TTFF can be relatively slow (e.g., a few minutes), e.g., in a weak-signal environment.

SUMMARY

A GPS (global positioning system) receiver is disclosed herein. In one embodiment, the GPS receiver includes a demodulator for obtaining ephemeris data and almanac data from a navigation message sent by satellites, and includes a calculator. The calculator is used for calculating almanac correction parameters according to coordinate differences between ephemeris-based coordinates of the satellites and almanac-based coordinates of the satellites. The GPS receiver also includes a satellite position calculator for calculating the ephemeris-based coordinates of the satellites according to the ephemeris data, for calculating the almanac-based coordinates of the satellites according to the almanac data, and for calculating positions of the satellites according to the ephemeris data, the almanac data and the almanac correction parameters.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
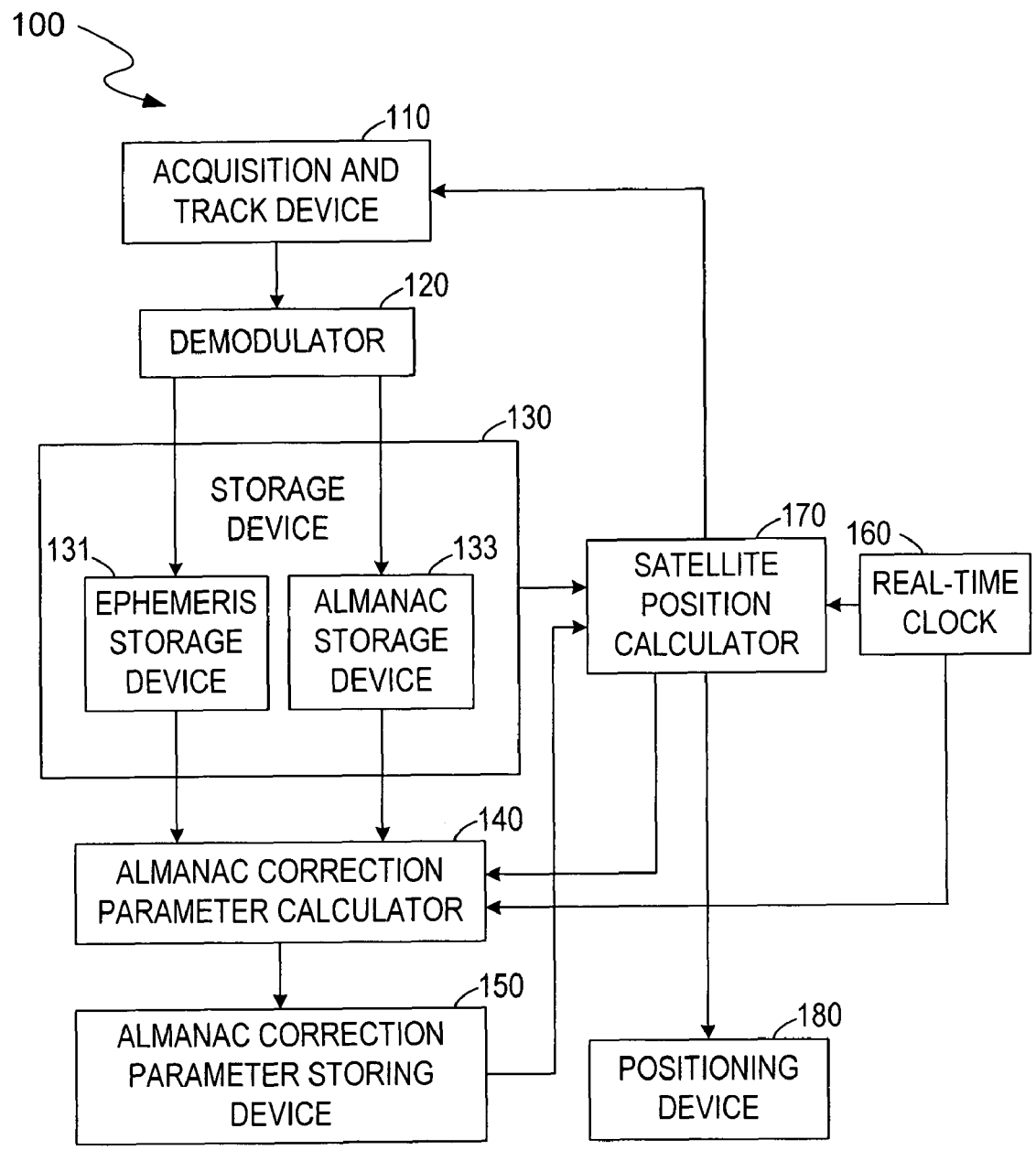
FIG. 1 is a block diagram of a GPS (global positioning system) receiver, in accordance with one embodiment of the present invention.

The present invention illustrates a GPS (global positioning system) receiver which can improve the fast time to first fix (TTFF). Since the embodiments shown in the drawings are only for illustrative purposes, some sub-components and/or peripheral components generally incorporated in the invention are omitted herein. In describing the embodiments in accordance with the present invention, specific terminologies are employed for the sake of clarity. However, the disclosure of this patent specification is not intended to be limited to the selected terminology and the specified embodiments. It is understood that each specific element includes all technical equivalents that operate in a similar manner.

FIG. 1 illustrates a block diagram of a GPS receiver 100, in accordance with one embodiment of the present invention. A time to first fix (TTFF) of the GPS receiver 100 can be improved via the employment of the almanac correction parameters which will be detailed described below. In one embodiment, the GPS receiver 100 can be included in a GPS system to process GPS signals from various satellites.

After the GPS receiver 100 is powered on, a satellite positioning calculator 170 included in the GPS receiver 100 can calculate relatively rough positions of the satellites according to the original/previous ephemeris data and almanac data stored in a storage device 130 and the original/previous almanac correction parameters stored in a storage device 150. An acquisition and track device 110 can acquire and track visible satellites according to the relatively rough positions of the satellites. In one embodiment, the satellites that can be acquired and tracked by the acquisition and track device 110 can be referred to as the visible satellites in the present disclosure. Then the acquisition and track device 110 can receive the navigation message from the satellites.

The GPS receiver 100 can also include a demodulator 120 for demodulating the received navigation message and for obtaining the corresponding ephemeris data and almanac data from the received navigation message provided/sent by the satellites. In one embodiment, the navigation message is a 50 Hz signal including data bits that describe the GPS date and time, and including the ephemeris data and the almanac data. The ephemeris data can contain orbital information and allows the GPS receiver 100 to calculate the position of each satellite. The almanac data can contain information and status concerning all the satellites including locations of all the satellites.

The storage device 130 is used to store the aforementioned ephemeris data and almanac data. The ephemeris data and the almanac data in the storage device 130 can be updated. In one embodiment, the storage device 130 can include an ephemeris storage device 131 for storing the ephemeris data and an almanac storage device 133 for storing the almanac data. In one embodiment, the ephemeris storage device 131 can be integrated with the almanac storage device 133 to a single storage device (e.g., the storage device 130). In another embodiment, the ephemeris storage device 131 can be separated from the almanac storage device 133.

A calculator (e.g., an almanac correction parameter calculator) 140 can be used to calculate the almanac correction parameters according to valid ephemeris data and valid almanac data. The almanac correction parameter calculator 140 can include a determination device (not shown in FIG. 1) that is used to verify the validity of the ephemeris data, the almanac data, and the almanac correction parameters according to the time thereof. In one embodiment, the ephemeris data is valid within four hours, the almanac data is valid within two weeks, and the almanac correction parameters are valid within eight hours. The storage device (e.g., an almanac correction parameter storage device) 150 is used to store the almanac correction parameters. The almanac correction parameters in the almanac correction parameter storage device 150 can be updated.

A real-time clock 160 is included in the GPS receiver 100 for recording an operating time of the GPS receiver 100 and converting the operating time to a GPS time. The satellite positioning calculator 170 included in the GPS receiver 100 can read the ephemeris data and the almanac data in the storage device 130 and the almanac correction parameters from the almanac correction parameter storage device 150. The satellite positioning calculator 170 can calculate the corrected positions (e.g., relatively precise positions) of the satellites according to the current GPS time, the updated ephemeris data, the updated almanac data, and the updated almanac correction parameters. A positioning device 180 can calculate a position of the GPS receiver 100 according to the corrected positions of the satellites.

Figure 2:
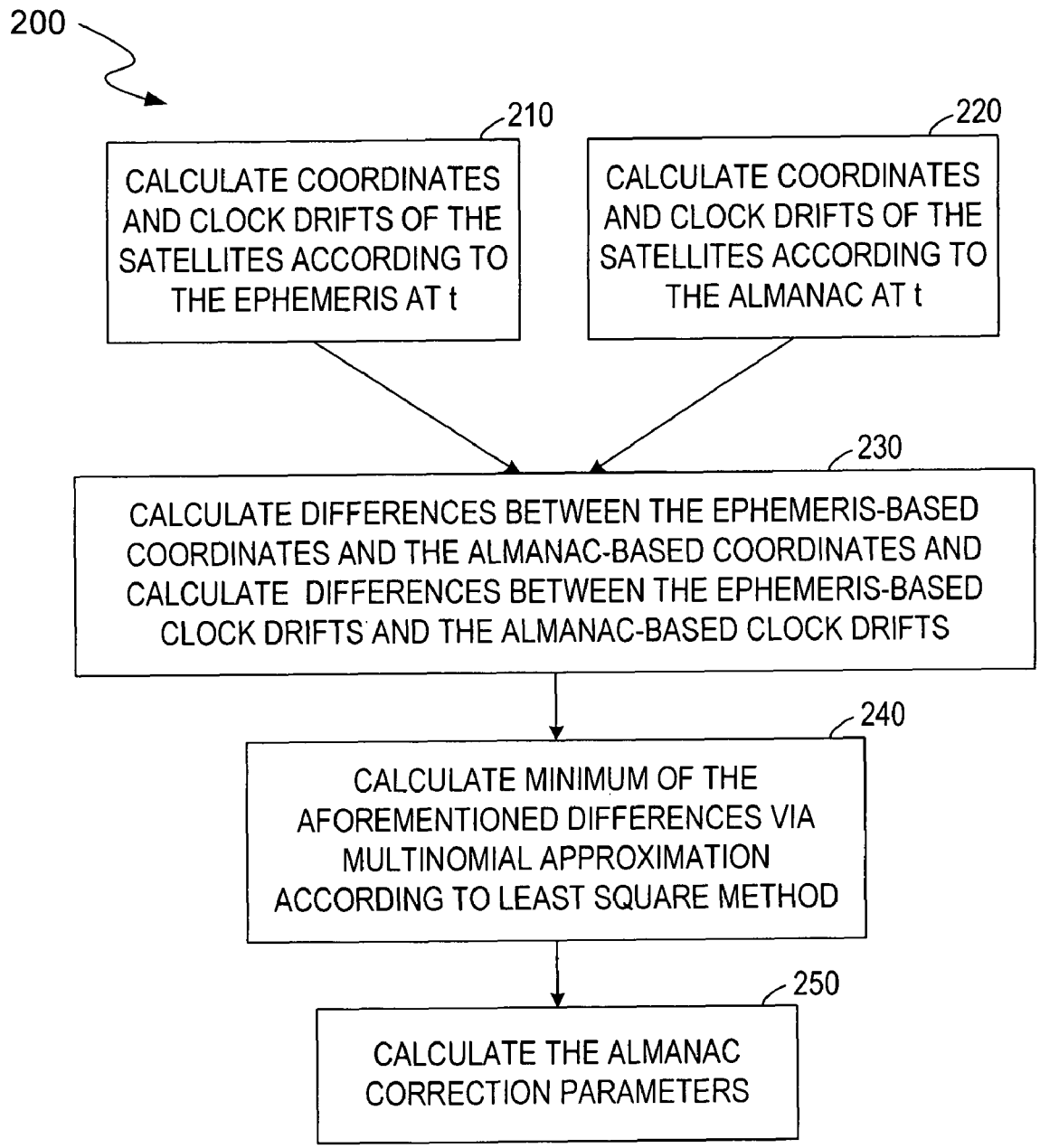
FIG. 2 is a flowchart of generating almanac correction parameters, in accordance with one embodiment of the present invention.

FIG. 2 is an exemplary flowchart 200 of generating the almanac correction parameters, in accordance with one embodiment of the present invention. The almanac correction parameters can be calculated by the almanac correction parameter calculator 140 in FIG. 1. In one embodiment, the almanac correction parameter calculator 140 calculates the almanac correction parameters according to coordinate differences between a plurality of ephemeris-based coordinates of the satellites and a plurality of almanac-based coordinates of the satellites and according to clock differences between ephemeris-based clock drifts of the satellites and almanac-based clock drifts of the satellites. In one embodiment, the satellite position calculator 170 calculates the ephemeris-based coordinates and the ephemeris-based clock drifts according to the ephemeris data, and calculates the almanac-based coordinates and calculates the almanac-based clock drifts according to the almanac data.

At step 210, three-dimensional ephemeris-based coordinates $x_e(t)$, $y_e(t)$, and $z_e(t)$ and an ephemeris-based clock drift $t_e(t)$ of each sampling point at each satellite can be calculated according to the corresponding ephemeris data by the satellite positioning calculator 170 at GPS time t. At step 220, three-dimensional almanac-based coordinates $x_a(t)$, $y_a(t)$, and $z_a(t)$ and an almanac-based clock drift $t_a(t)$ of each sampling point at each satellite can be calculated according to the corresponding almanac data by the satellite positioning calculator 170 at time t. At step 230, coordinate differences $\Delta x(t)$, $\Delta y(t)$, and $\Delta z(t)$ between the ephemeris-based coordinates and the almanac-based coordinates are calculated by the almanac correction parameter calculator 140 after the almanac correction parameter calculator 140 receives the ephemeris-based coordinators and the almanac-based coordinates calculated by the satellite positioning calculator 170 at time t, in one embodiment. More specifically, $\Delta x(t)$ can indicate the coordinate difference between $x_e(t)$ and $x_a(t)$ at the same sampling point, $\Delta y(t)$ can indicate the coordinate difference between $y_e(t)$ and $y_a(t)$ at the same sampling point, and $z_a(t)$ can indicate the coordinate difference between $z_e(t)$ and $z_a(t)$ at the same sampling point, in one embodiment. The clock difference $\Delta t(t)$ between the ephemeris-based clock drift $t_e(t)$ and the almanac-based clock drift $t_a(t)$ is also calculated by the almanac correction parameter calculator 140, in one embodiment. In one embodiment, $\Delta x(t)$, $\Delta y(t)$, $\Delta z(t)$, and $\Delta t(t)$ can be high-order multinomial functions of time t respectively, shown in equations (1), (2), (3), and (4).

$$\Delta x(t) = \sum_{k=0}^{n} a_k t^k \tag{1}$$

$$\Delta y(t) = \sum_{k=0}^{n} b_k t^k \tag{2}$$

$$\Delta z(t) = \sum_{k=0}^{n} c_k t^k \tag{3}$$

$$\Delta t(t) = \sum_{k=0}^{n} d_k t^k \tag{4}$$

N represents the highest order of the multinomial functions. $a_0, a_1 \ldots a_n$, $b_0, b_1 \ldots b_n$, $c_0, c_1 \ldots c_n$, and $d_0, d_1 \ldots d_n$ are the almanac correction parameters.

At step 240, the respective minimum values of the differences $\Delta x(t)$, $\Delta y(t)$, $\Delta z(t)$, and $\Delta t(t)$ are calculated via a multinomial approximation according to the least square method by the almanac correction parameters calculator 140, in one embodiment. Assume that the number of sampling points of each satellite is m+1, then the least square approximation of the minimum value of $\Delta x(t)$ can be shown in equation (5).

$$\min\left(\sum_{i=0}^{m}\left(\sum_{k=0}^{n} a_k t^i - \Delta x(t)\right)^2\right) \tag{5}$$

At step 250, the almanac correction parameters can be obtained according to the least-square approximation, e.g., equation (5). More specifically, the almanac correction parameters $a_0, a_1 \ldots a_n$ for the x-axis coordinates can be calculated according to the least square approximation by equation (6) which is equivalent to equation (5), in one embodiment.

$$\begin{bmatrix} m+1 & \sum_{i=0}^{m} t_i & \cdots & \sum_{i=0}^{m} t_i^n \\ \sum_{i=0}^{m} t_i & \sum_{i=0}^{m} t_i^2 & \cdots & \sum_{i=0}^{m} t_i^{n+1} \\ \vdots & \vdots & & \vdots \\ \sum_{i=0}^{m} t_i^n & \sum_{i=0}^{m} t_i^{n+1} & \cdots & \sum_{i=0}^{m} t_i^{2n} \end{bmatrix} \begin{bmatrix} a_0 \\ a_1 \\ \vdots \\ a_n \end{bmatrix} = \begin{bmatrix} \sum_{i=0}^{m} \Delta x(t_i) \\ \sum_{i=0}^{m} t \cdot \Delta x(t_i) \\ \vdots \\ \sum_{i=0}^{m} t^n \cdot \Delta x(t_i) \end{bmatrix} \tag{6}$$

In one embodiment, each satellite is started to be sampled from two hours before a reference time $t_{oa}$ (i.e., $t_{oa}-2$) in every twenty minutes. $t_{oa}$ is a time referred as the reference time for sampling, in one embodiment. $t_i$ represents a sampling time for the i-th sampling point. $\Delta x(t_i)$ represents the coordinate difference between the ephemeris-based coordinate and the almanac-based coordinate for the x axis for the i-th sampling point at $t_i$. The number of the sampling points m+1 for each satellite is 12, in one embodiment. Accordingly, the sample period $T_{sample}$ for sampling 12 sampling points of each satellite can be four hours (e.g., 20 minutes*12=240 minutes=4 hours), in one embodiment. In one embodiment, the almanac correction parameters can be remained valid for eight hours after the update of the previous almanac correction parameters.

Similar to equation (6), the almanac correction parameters $b_0, b_1 \ldots b_n$, $c_0, c_1 \ldots c_n$, and $d_0, d_1 \ldots d_n$ for the y-axis coordinates, z-axis coordinates and the clock drift can also be obtained via the least-square approximation of Δy(t), Δz(t), and Δt(t) respectively. If the value of n is greater, more data can be provided for approximation and thus the accuracy of the almanac correction parameters can be higher. If the sample period $T_{sample}$ of the satellites is longer, a longer valid period for the almanac correction parameters can be obtained. For example, if the sample period of the satellites is greater than fours hours, the valid period for the almanac correction parameters can be greater than eight hours after the update of the previous almanac correction parameters.

Figure 3:
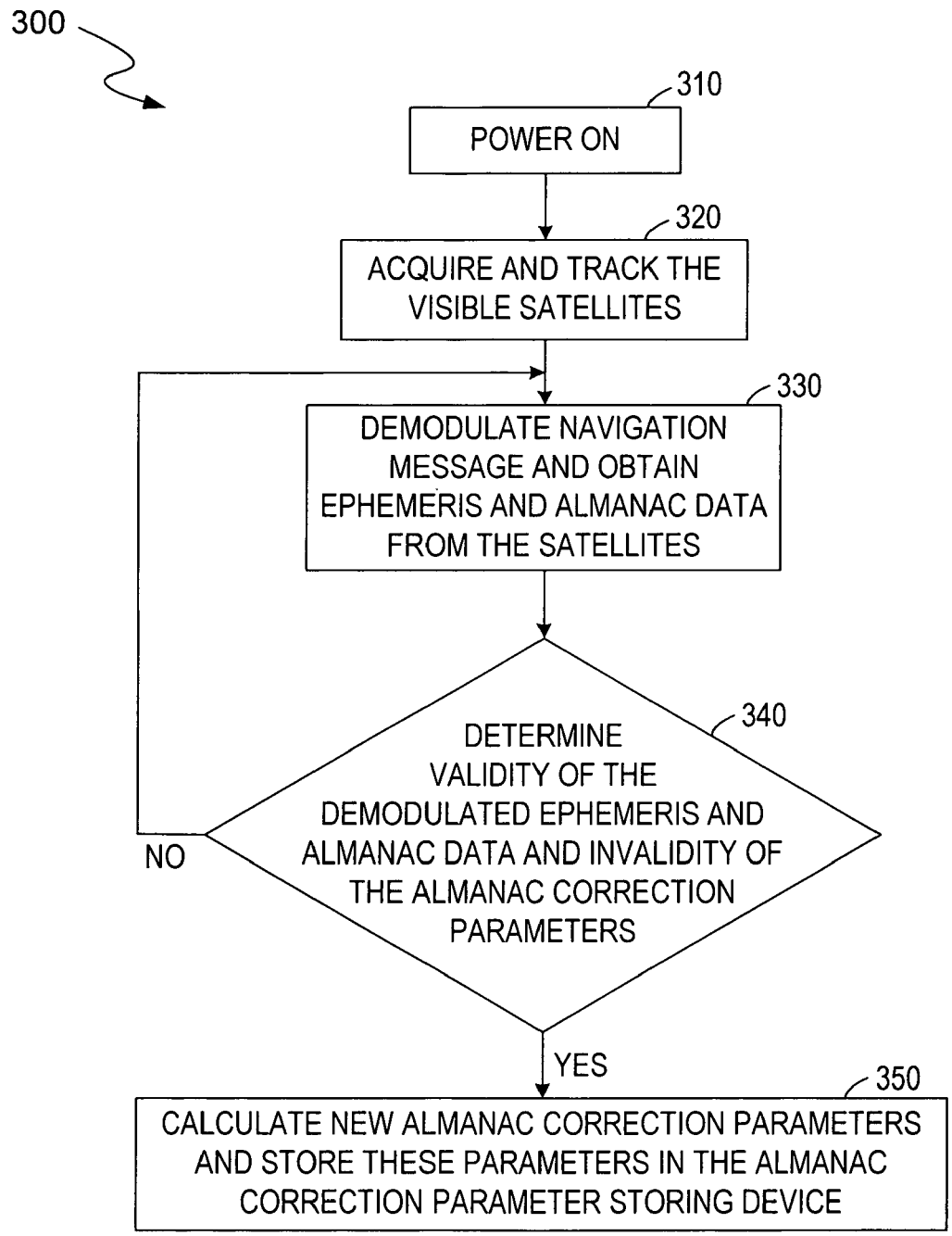
FIG. 3 is a flowchart of updating almanac correction parameters, in accordance with one embodiment of the present invention.

FIG. 3 is a flowchart 300 of updating the almanac correction parameters, in accordance with one embodiment of the present invention. The almanac correction parameters can be updated by the almanac correction parameter calculator 140 and stored in the almanac correction parameter storage device 150 in FIG. 1. FIG. 3 is described in combination with FIG. 1.

At step 310, the GPS receiver 100 is powered on. At step 320, the acquisition and track device 110 can acquire and track the visible satellites. At step 330, the modulator 120 can demodulate the received navigation message of the visible satellites and obtain the corresponding ephemeris data and almanac data from the received navigation message.

At step 340, the almanac correction parameter calculator 140 can verify the validity of the new ephemeris data, the new almanac data, and the previous almanac correction parameters according to the time thereof. In one embodiment, the ephemeris data is considered to be valid within four hours, the almanac data is considered to be valid within two weeks, and the almanac correction parameters are considered to be valid within eight hours. In one embodiment, new almanac correction parameters will be calculated by the almanac correction parameter calculator 140 if the original/previous almanac correction parameters are invalid, and both of the ephemeris data and the almanac data are still valid at step 350. If both of the ephemeris data and the almanac data are invalid, or all the ephemeris data, the almanac data and the almanac correction parameters are valid, the flowchart 300 returns to step 330 to start a next cycle. At step 350, the new almanac correction parameters can be stored in the almanac correction parameter storage device 150. In other words, the almanac correction parameter storage device 150 can be updated with the new almanac correction parameters.

Figure 4:
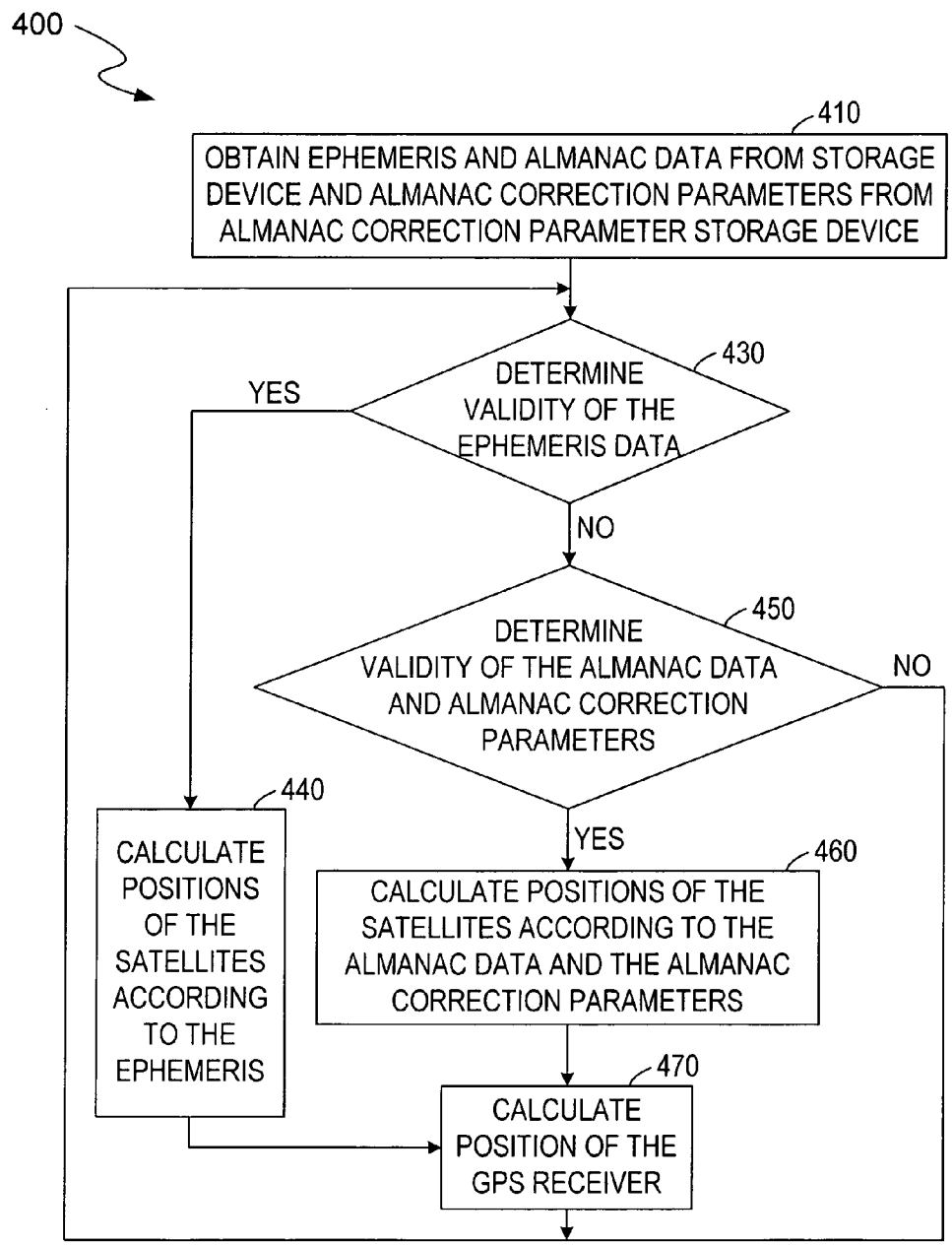
FIG. 4 is a flowchart of calculating a position of a GPS receiver, in accordance with one embodiment of the present invention.

FIG. 4 is a flowchart 400 of calculating a position of a GPS receiver (e.g., the GPS receiver 100 in FIG. 1), in accordance with one embodiment of the present invention. At step 410, the ephemeris and almanac data can be obtained from the storage device 130 and the almanac correction parameters can be obtained from the almanac correction parameter storage device 150. At step 430, the determination device (not shown in FIG. 1) included in the almanac correction parameter calculator 140 can verify the validity of the ephemeris data. If the ephemeris data is valid, the positions of the visible satellites can be calculated respectively according to the ephemeris data by the satellite position calculator 170 at step 440. If the ephemeris data is invalid, the determination device can further verify validity of the almanac data and the almanac correction parameters at step 450. If the almanac data or the almanac correction parameters are invalid, the flowchart 400 will return to step 430 for repetitively verify the validity of the ephemeris data and the almanac data stored in the storage device 130 and the almanac correction parameters stored in the storage device 150, e.g., by the satellite position calculator 170. If the almanac data and the almanac correction parameters are valid, the positions of the visible satellites can be calculated according to the valid almanac data and almanac correction parameters by the satellite position calculator 170 at step 460 that will be described in detail below.

In one embodiment, the coordinates x', y' and z' of each visible satellite and the clock drift T' of each visible satellite at time t can be calculated according to the almanac data. Then correction values Δx'(t), Δy'(t), Δz'(t) and ΔT'(t) for the coordinates x', y' and z' and the clock drift T' are respectively calculated according to the almanac correction parameters shown as equations (7), (8), (9) and (10).

$$\Delta x'(t) = \sum_{k=0}^{n} a_k t^k \tag{7}$$

$$\Delta y'(t) = \sum_{k=0}^{n} b_k t^k \tag{8}$$

$$\Delta z'(t) = \sum_{k=0}^{n} c_k t^k \tag{9}$$

$$\Delta T'(t) = \sum_{k=0}^{n} d_k t^k \tag{10}$$

N is the highest order for the almanac correction parameters and t is the current GPS time. $a_k$, $b_k$, and $c_k$ are the almanac correction parameters for the corrected coordinates x, y, and z at time t. $d_k$ is the almanac correction parameter for the corrected time drift T.

x, y, z, and T can be calculated according to the correction values obtained at time t, shown in equation (11), (12), (13), and (14).

$$x = x' + \Delta x' \tag{11}$$

$$y = y' + \Delta y' \tag{12}$$

$$z = z' + \Delta z' \tag{13}$$

$$T = T' + \Delta T' \tag{14}$$

At step 470, the position of the GPS receiver 100 can be calculated according to the corrected position of each satellite.

In operation, relatively rough positions of the satellites can be calculated according to the original ephemeris data and almanac data and/or the original almanac correction parameters after the GPS receiver 100 is powered on. The acquisition and track device 110 can acquire and track visible satellites according to the relatively rough positions of the satellites. Navigation message of the visible satellites can be obtained so that the corresponding new ephemeris data and almanac data are obtained by the demodulator 120. The original/previous ephemeris data and almanac data in the storage device 130 can be updated by the new ephemeris data and almanac data. The updated ephemeris data and almanac data can be employed to calculate the new almanac correction parameters by the almanac correction parameter calculator 140. Hence, the almanac correction parameters stored in the storage device 150 can be updated by the new almanac correction parameters.

The satellite position calculator 170 can calculate the corrected positions of the satellites according to the updated ephemeris data and almanac data and the updated almanac correction parameters. The position of the GPS receiver 100 can be calculated according to the corrected positions of the satellites.

Advantageously, the combination of the almanac data and the almanac correction parameters is employed for calculating the position of the GPS receiver 100 when the ephemeris data is invalid, in one embodiment. The efficiency of acquisition and track can be improved and the precision of positioning can be increased due to the corrected positions calculated by the positioning calculator 170. As a result, The TTFF (time to first fix) can also be decreased. In one embodiment, the TTFF can be decreased to 15 seconds.

The embodiments that have been described herein, however, are but some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A global positioning system (GPS) receiver comprising:
a demodulator for obtaining ephemeris data and almanac data from a navigation message sent by a plurality of satellites;
a calculator for calculating a plurality of almanac correction parameters according to coordinate differences between a plurality of ephemeris-based coordinates of said satellites and a plurality of almanac-based coordinates of said satellites and according to clock differences between a plurality of ephemeris-based clock drifts of said satellites and a plurality of almanac-based clock drifts of said satellites; and
a satellite position calculator for calculating said ephemeris-based coordinates according to said ephemeris data, for calculating said almanac-based coordinates according to said almanac data, and for calculating a plurality of positions of said satellites according to said ephemeris data, said almanac data and said almanac correction parameters,
wherein said calculator verifies validity of said ephemeris data, said almanac data and said almanac correction parameters and calculates a new plurality of almanac correction parameters if previous almanac correction parameters are invalid and said ephemeris data and said almanac data are valid.

2. The GPS receiver of claim 1, wherein said satellite position calculator calculates said positions of said satellites according to said ephemeris data if said ephemeris data is valid.

3. The GPS receiver of claim 1, wherein said satellite position calculator calculates said positions of said satellites according to said almanac data and said almanac correction parameters if said ephemeris data is invalid and said almanac data and said almanac correction parameters are valid.

4. The GPS receiver of claim 1, wherein said satellite position calculator calculates said ephemeris-based clock drifts and said almanac-based clock drifts according to said ephemeris data and said almanac data respectively.

5. The GPS receiver of claim 4, wherein said calculator calculates minimum values of said coordinate differences between said ephemeris-based coordinates and said almanac-based coordinates obtained at time t according to a least square approximation of said coordinate differences, and calculates minimum values of said clock differences between said ephemeris-based clock drifts and said almanac-based clock drifts obtained at said time t according to a least square approximation of said clock differences, in order to obtain said almanac correction parameters.

6. The GPS receiver of claim 1, wherein said almanac correction parameters comprise parameters $a_0, a_1, \ldots a_n$, wherein said parameters $a_0, a_1 \ldots a_n$ are calculated according to said least square approximation by equation (1), $$\begin{bmatrix} m+1 & \sum_{i=0}^{m} t_i & \cdots & \sum_{i=0}^{m} t_i^n \\ \sum_{i=0}^{m} t_i & \sum_{i=0}^{m} t_i^2 & \cdots & \sum_{i=0}^{m} t_i^{n+1} \\ \vdots & \vdots & & \vdots \\ \sum_{i=0}^{m} t_i^n & \sum_{i=0}^{m} t_i^{n+1} & \cdots & \sum_{i=0}^{m} t_i^{2n} \end{bmatrix} \begin{bmatrix} a_0 \\ a_1 \\ \vdots \\ a_n \end{bmatrix} = \begin{bmatrix} \sum_{i=0}^{m} \Delta x(t_i) \\ \sum_{i=0}^{m} t \cdot \Delta x(t_i) \\ \vdots \\ \sum_{i=0}^{m} t^n \cdot \Delta x(t_i) \end{bmatrix} \quad (1)$$

and wherein m+1 represents a number of sampling points of one satellite of said satellites, $t_i$ represents a sample time, n represents a highest order of said equation (1), and $\Delta x(t_i)$ represents a coordinate difference between one almanac-based coordinate of said satellite and one ephemeris-based coordinate of said satellite.

7. The GPS receiver of claim 1, wherein said satellite position calculator calculates said almanac-based coordinates x', y', z', and said almanac-based clock drifts T' according to said almanac data at time t, wherein said satellite position calculator further calculates correction values $\Delta x'(t)$, $\Delta y'(t)$, $\Delta z'(t)$, and $\Delta T'$ shown by equations (2), (3), (4), and (5) respectively, $$\Delta x'(t) = \sum_{k=0}^{n} a_k t^k \quad (2)$$

$$\Delta y'(t) = \sum_{k=0}^{n} b_k t^k \quad (3)$$

$$\Delta z'(t) = \sum_{k=0}^{n} c_k t^k \quad (4)$$

$$\Delta T'(t) = \sum_{k=0}^{n} d_k t^k \quad (5)$$

and wherein said satellite position calculator calculates a plurality of corrected coordinates x, y, z, and a plurality of corrected clock drifts T of said satellites by equations (6), (7), (8), and (9), $$x = x' + \Delta x' \quad (6)$$

$$y = y' + \Delta y' \quad (7)$$

$$z = z' + \Delta z' \quad (8)$$

$$T = T' + \Delta T' \quad (9)$$

wherein n represents a highest order of said almanac correction parameters, t represents a current GPS time, $a_k, b_k, c_k, d_k$ represents said almanac correction parameters.

8. The GPS receiver of claim 1, wherein said satellite position calculator calculates a plurality of correction values according to said almanac correction parameters respectively, and wherein said satellite position calculator calculates said positions by adding said correction values to said almanac-based coordinates respectively.

9. The GPS receiver of claim 1, further comprising:
a positioning device coupled to said satellite position calculator for calculating a position of said GPS receiver according to said positions of said satellites.

10. The GPS receiver of claim 1, further comprising:
a storage device for storing said almanac correction parameters.

11. A method for positioning global positioning system (GPS) receiver, comprising:
obtaining ephemeris data and almanac data from a navigation message sent by a plurality of satellites;
calculating a plurality of ephemeris-based coordinates and a plurality of ephemeris-based clock drifts of said satellites according to said ephemeris data;
calculating a plurality of almanac-based coordinates and a plurality of almanac-based clock drifts of said satellites according to said almanac data;
calculating a plurality of almanac correction parameters according to coordinate differences between said ephemeris-based coordinates and said almanac-based coordinates and according to clock differences between said ephemeris-based clock drifts and said almanac-based clock drifts;
calculating a plurality of positions of said satellites according to said ephemeris data, said almanac data and said almanac correction parameters;
verifying validity of said ephemeris data, said almanac data and said almanac correction parameters; and
calculating a new plurality of almanac correction parameters if previous almanac correction parameters are invalid and said ephemeris data and said almanac data are valid.

12. The method of claim 11, further comprising:
calculating said positions of said satellites according to said ephemeris data if said ephemeris data is valid.

13. The method of claim 11, further comprising:
calculating said positions of said satellites according to said almanac data and said almanac correction parameters if said ephemeris data is invalid and said almanac data and said almanac correction parameters are valid.

14. The method of claim 11, wherein calculating said almanac correction parameters further comprises:
calculating minimum values of said coordinates differences between said ephemeris-based coordinates and said almanac-based coordinates obtained at time t according to a least square approximation of said coordinate differences; and
calculating minimum values of said clock differences between said ephemeris-based clock drifts and said almanac-based clock drifts obtained at said time t according to a least square approximation of said clock differences.

15. The method of claim 11, wherein said almanac correction parameters comprises parameters $a_0, a_1, \ldots a_n$, wherein said parameters $a_0, a_1 \ldots, a_n$ are calculated according to said least square approximation by equation (10), $$\begin{bmatrix} m+1 & \sum_{i=0}^{m} t_i & \cdots & \sum_{i=0}^{m} t_i^n \\ \sum_{i=0}^{m} t_i & \sum_{i=0}^{m} t_i^2 & \cdots & \sum_{i=0}^{m} t_i^{n+1} \\ \vdots & \vdots & & \vdots \\ \sum_{i=0}^{m} t_i^n & \sum_{i=0}^{m} t_i^{n+1} & \cdots & \sum_{i=0}^{m} t_i^{2n} \end{bmatrix} \begin{bmatrix} a_0 \\ a_1 \\ \vdots \\ a_n \end{bmatrix} = \begin{bmatrix} \sum_{i=0}^{m} \Delta x(t_i) \\ \sum_{i=0}^{m} t \cdot \Delta x(t_i) \\ \vdots \\ \sum_{i=0}^{m} t^n \cdot \Delta x(t_i) \end{bmatrix} \quad (10)$$

and wherein m+1 represents a number of sampling points of one satellite of said satellites, $t_i$ represents a sample time, n represents a highest order of said equation (10), and $\Delta x(t_i)$ represents a coordinate difference between one almanac-based coordinate of said satellite and one ephemeris-based coordinate of said satellite.

16. The method of claim 11, wherein calculating said positions of said satellites further comprises:
calculating a plurality of correction values according to said almanac correction parameters respectively; and
adding said correction values to said almanac-based coordinates respectively to calculate said positions.

17. The method of claim 11, wherein calculating said positions of said satellites further comprises:
calculating said almanac-based coordinates x', y', z' of said satellites, and said almanac-based clock drifts T' according to said almanac data at time t;
calculating correction values $\Delta x'(t)$, $\Delta y'(t)$, $\Delta z'(t)$, and $\Delta T'(t)$ shown by equations (11), (12), (13), and (14) respectively, $$\Delta x'(t) = \sum_{k=0}^{n} a_k t^k \quad (11)$$

$$\Delta y'(t) = \sum_{k=0}^{n} b_k t^k \quad (12)$$

$$\Delta z'(t) = \sum_{k=0}^{n} c_k t^k \quad (13)$$

$$\Delta T'(t) = \sum_{k=0}^{n} d_k t^k \quad (14)$$

wherein n represents a highest order for said almanac correction parameters, t represents a current GPS time, and $a_k$, $b_k$, $c_k$, and $d_k$ represent said almanac correction parameters; and
calculating a plurality of corrected coordinates x, y, z, and a plurality of corrected clock drifts T of said satellites by equations (15), (16), (17), and (18), $$x = x' + \Delta x' \quad (15)$$

$$y = y' + \Delta y' \quad (16)$$

$$z = z' + \Delta z' \quad (17)$$

$$T = T' + \Delta T' \quad (18).$$

18. The method of claim 11, further comprising:
calculating a position of said GPS receiver according to said positions of said satellites.

19. The method of claim 11, further comprising:
storing said almanac correction parameters.

20. A GPS (global positioning system) comprising:
an acquisition and track device for acquiring and tracking a plurality of satellites and obtaining a navigation message from said satellites;
a demodulator for obtaining ephemeris data and almanac data from said navigation message;
a calculator for calculating a plurality of almanac correction parameters according to coordinate differences between a plurality of ephemeris-based coordinates of said satellites and a plurality of almanac-based coordinates of said satellites and according to clock differences between a plurality of ephemeris-based clock drifts of said satellites and a plurality of almanac-based clock drifts of said satellites; and
a satellite position calculator coupled to said acquisition and track device and for calculating said ephemeris-based coordinates and said ephemeris-based clock drifts according to said ephemeris data, for calculating said almanac-based coordinates and said almanac-based clock drifts according to said almanac data, and for calculating a plurality of positions of said satellites respectively according to said ephemeris data, said almanac data and said almanac correction parameters,
wherein said calculator verifies validity of said ephemeris data, said almanac data and said almanac correction parameters and calculates a new plurality of almanac correction parameters if previous almanac correction parameters are invalid and said ephemeris data and said almanac data are valid.

21. The GPS system of claim 20, wherein said calculator calculates minimum values of said coordinate differences between said ephemeris-based coordinates and said almanac-based coordinates obtained at time t according to a least square approximation of said coordinate differences, and calculates minimum values of said clock differences between said ephemeris-based clock drifts and said almanac-based clock drifts obtained at said time t according to a least square approximation of said clock differences, in order to obtain said almanac correction parameters.

22. The GPS system of claim 21, wherein said almanac correction parameters comprise parameters $a_0, a_1, \ldots a_n$, wherein said parameters $a_0, a_1 \ldots a_n$ are calculated according to said least square approximation by equation (19), $$\begin{bmatrix} m+1 & \sum_{i=0}^{m} t_i & \cdots & \sum_{i=0}^{m} t_i^n \\ \sum_{i=0}^{m} t_i & \sum_{i=0}^{m} t_i^2 & \cdots & \sum_{i=0}^{m} t_i^{n+1} \\ \vdots & \vdots & & \vdots \\ \sum_{i=0}^{m} t_i^n & \sum_{i=0}^{m} t_i^{n+1} & \cdots & \sum_{i=0}^{m} t_i^{2n} \end{bmatrix} \begin{bmatrix} a_0 \\ a_1 \\ \vdots \\ a_n \end{bmatrix} = \begin{bmatrix} \sum_{i=0}^{m} \Delta x(t_i) \\ \sum_{i=0}^{m} t \cdot \Delta x(t_i) \\ \vdots \\ \sum_{i=0}^{m} t^n \cdot \Delta x(t_i) \end{bmatrix} \quad (19)$$

wherein m+1 represents a number of sampling points of one satellite of said satellites, $t_i$ represents a sample time, n represents a highest order of said equation, and $\Delta x(t_i)$ represents a coordinate difference between one almanac-based coordinate of said satellite and one ephemeris-based coordinates of said satellite.

23. The GPS system of claim 20, wherein said satellite position calculator calculates a plurality of correction values according to said almanac correction parameters respectively, and wherein said satellite position calculator calculates said positions by adding said correction values to said almanac-based coordinates respectively.

* * * * *